May 12, 1953 W. DE BACK 2,638,137
ROTARY STEAM PEELING MACHINE
Filed March 12, 1949 4 Sheets-Sheet 1
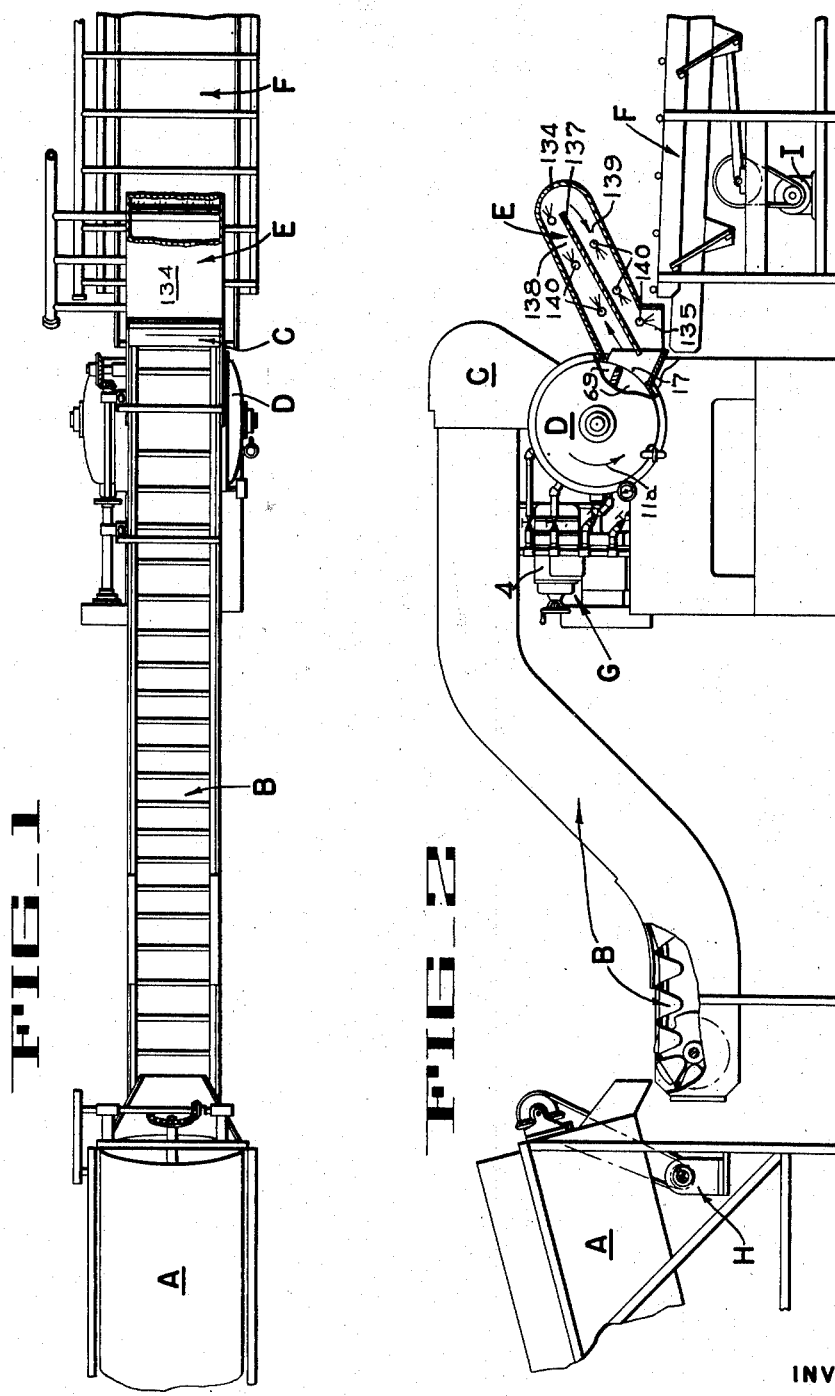
INVENTOR
WILLIAM DE BACK
BY Hans G. Hoffmeister
ATTORNEY

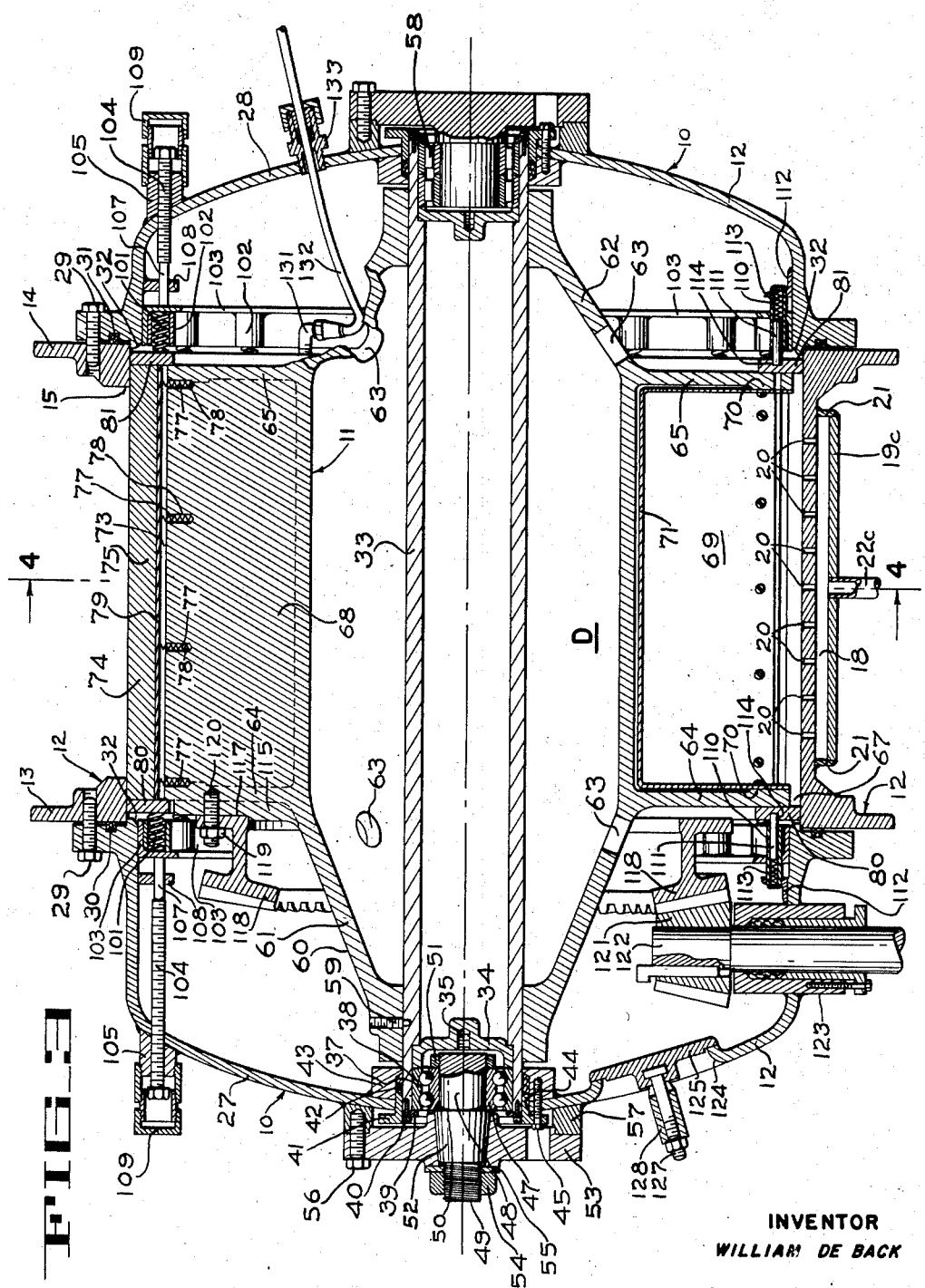

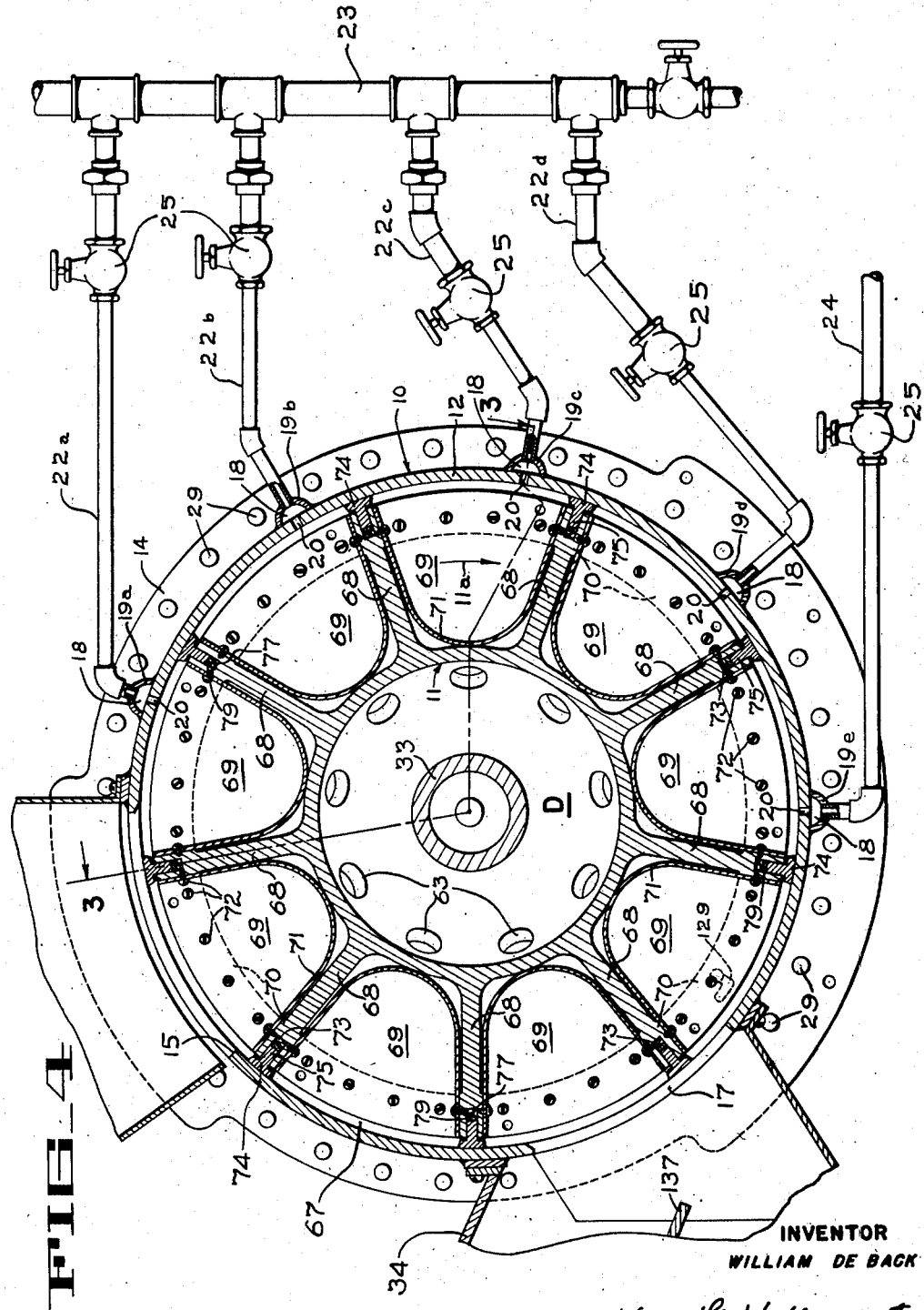

May 12, 1953  W. DE BACK  2,638,137
ROTARY STEAM PEELING MACHINE
Filed March 12, 1949  4 Sheets-Sheet 4
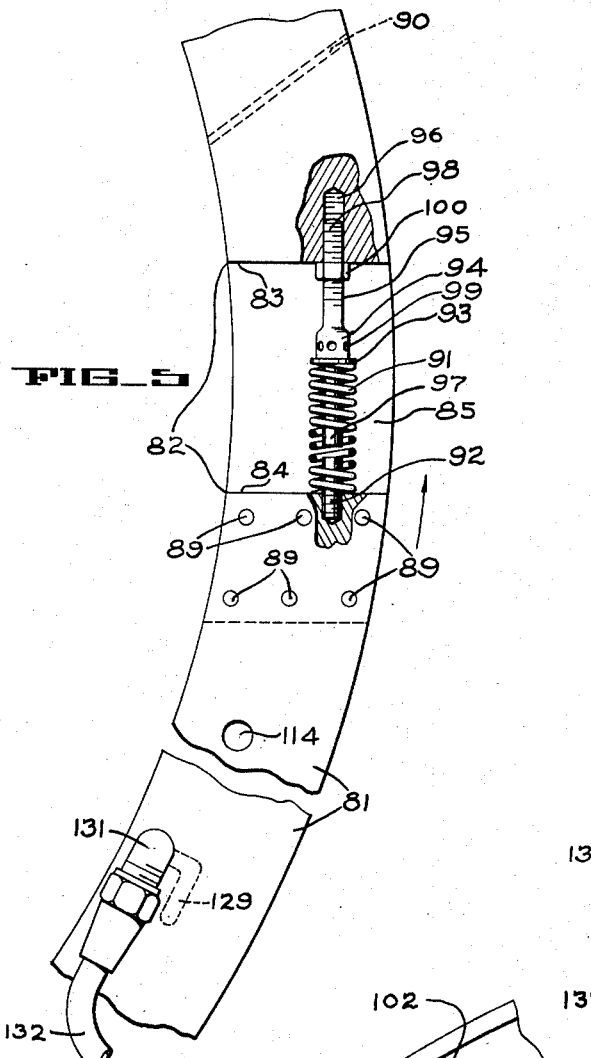
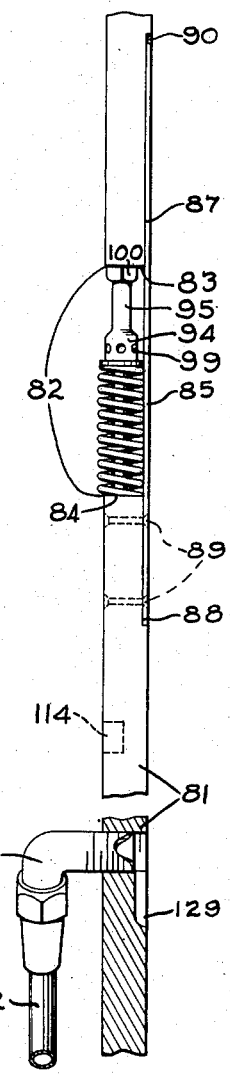
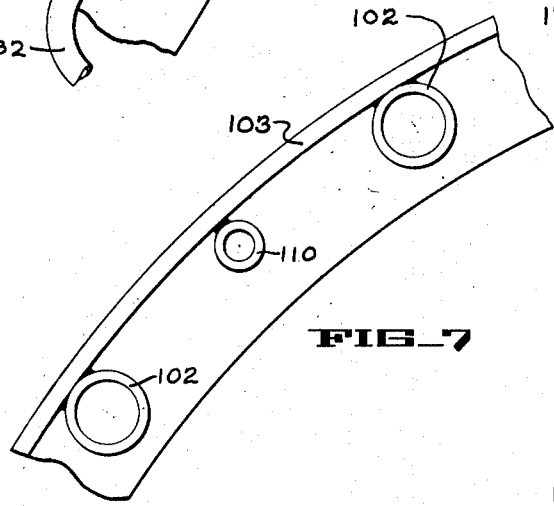
INVENTOR
WILLIAM DE BACK
BY Hans G. Hoffmeister
ATTORNEY Patented May 12, 1953

2,638,137

UNITED STATES PATENT OFFICE 2,638,137

ROTARY STEAM PEELING MACHINE

William de Back, San Jose, Calif., assignor to Food Machinery and Chemical Corporation, San Jose, Calif., a corporation of Delaware Application March 12, 1949, Serial No. 81,184

7 Claims. (Cl. 146—47)

The present invention appertains to rotary steam peeling machines.

More particularly, it relates to an improvement in rotary steam peeling machines for loosening and removing the skins of thin skinned fruit and vegetable products.

An object of the present invention is to provide an improved steam peeler for food products.

Another object is to provide a rotary steam peeler for food products wherein food products may be fed and processed in a simple, rapid cycle.

Another object is to provide an improved rotary steam peeler for food products with improved pressure sealing and control arrangement.

Another object is to provide a rotary steam peeler wherein food products are subjected to a limited tumbling operation during steam processing to expose all exterior parts to the action of steam.

A still further object of the present invention is to provide a steam peeling mechanism for food products with improved operating and drive characteristics.

Another object is to provide facilities for feeding food products continuously in a generally downward path during charging, steam processing, and discharging operations.

Another object is to provide facilities for steam peeling food products wherein the food products are subjected to a gravity tumbling operation during steam processing to expose all parts of each product to steam action.

These and other objects and advantages of the invention will become apparent from the following description and the accompanying drawings in which:

Fig. 1 is a plan view in reduced scale showing a steam peeler embodying the present invention assembled with product feeding and skin removing mechanisms, and a steam condensing device, certain portions being broken away.

Fig. 2 is a side view of Fig. 1, certain portions being broken away to show interior construction.

Fig. 3 is a fragmentary, partially rotated, axial section in enlarged scale of the rotary steam peeler taken along the broken line 3—3 of Fig. 4.

Fig. 4 is a vertical section taken along the line 4—4 of Fig. 3.

Fig. 5 is an enlarged fragmentary elevation showing portions of a rotor sealing ring having an expanding sealed joint incorporated therein and having a vent connection mounted thereon.

Fig. 6 is an edge view of the fragments shown in Fig. 5.

Fig. 7 is a fragmentary elevation of a portion of a spring supporting pressure ring.

Referring now to the drawings, the assembly shown in Figs. 1 and 2 includes a liquid treating or washing vat A in which food products to be peeled are cleaned and then are discharged onto a pocketed conveyor B. The conveyor travels upwardly along an inclined guideway so that individual pockets in the conveyor will be tilted rearwardly to tilt off excess food products beyond the capacity of individual pockets. The food products are discharged in a usual manner from the upper end of the conveyor B and drop by gravity downwardly through a hopper C into pockets of a rotary steam peeler D, to be described in detail later herein.

From a discharge outlet in the lower side of the steam peeler, the products are released and drop by gravity through a steam condenser E and onto a shaker spray table F where the skins of the products, loosened by their passage through the steam peeler D, are removed. While being carried along this shaker table the products are subjected to water spray washing to free them from their skins. All of the above devices, with the exception of the rotary steam peeler and the steam condenser, are well known in the art.

A drive motor G of the controllable speed type is mounted to drive the steam peeler D and the conveyor B, and a similarly controllable speed drive motor H is mounted to drive the feed mechanism of the vat A. The shaker table F also is provided with a usual drive motor I.

Referring now to the details of the particular embodiment of the rotary steam peeler D illustrated, the principal parts thereof (Figs. 3 and 4) comprise a rotor housing or chamber 10 and a rotor 11 mounted therein. The rotor housing has a cylindrical central portion 12 with radially extending annular end flanges 13 and 14 integral therewith. The rotor housing may be of cast metal, such as steel, although it is preferred to fabricate it by welding from stainless-steel-clad steel plate material. This material withstands the corrosive action of the various fruit and vegetable juices to which it is subjected in use.

The cylindrical central housing portion 12 has an inlet opening 15 in the upper portion thereof and a discharge opening 17 in its lower quadrant below the inlet opening. The relative positions of these openings are best shown in Fig. 4.

A plurality of steam supply passages 18 for supplying steam to the interior of the rotor housing 10 comprise semi-cylindrical shells 19a, 19b, 19c, 19d, and 19e, Figs. 3 and 4. These shells are mounted transversely of the cylindrical body portion 12 to overlie rows of aligned holes 20 through the cylindrical wall of the housing. The shells 19 may comprise half sections of pipe cut longitudinally on their mid-planes and welded to the housing. The end of these shells are closed by semi-disc shaped plates 21, Fig. 3, welded thereto. Each of the four uppermost shells 19a, 19b, 19c, and 19d is connected by pipes 22a, 22b, 22c, and 22d, respectively, to a steam header pipe 23, which, in turn, is connected to a suitable source of steam under pressure. A discharge or pressure relief pipe 24 is connected in a similar manner to the lowermost shell 19e.

Each of the pipes 22a, 22b, 22c, 22d, and 24 preferably has a manually controlled valve, such as the valve 25, mounted to control the flow of steam therethrough. The shells 19 and their associated rows of openings 20 through which steam is supplied to and released from the interior of the housing 10 are spaced apart by angular distances substantially equal to those between adjacent radial partitions of the product feeding rotor 11 to be described in detail later herein.

A pair of bell shaped end closure members 27 and 28 are mounted one on each end of the central housing portion 12, and are secured thereto as by cap screws 29. Sealing gaskets 30 and 31 are mounted in grooves in the end closure members to engage the end faces of the central housing portion 12 to form a steam tight seal therewith. The end housings preferably have inwardly extending annular flanges 32 adapted to fit closely within the ends of the cylindrical central housing portion to position the end members accurately in coaxial relation to the housing, and to secure the parts against relative axial displacement.

A tubular rotor shaft 33 is journaled coaxially of the central housing portion 12 (Fig. 3). The left hand end of the rotor shaft, as illustrated in Fig. 3, is counterbored to receive a cup shaped bearing support 34. This bearing support has a threaded hole 35 in the bottom thereof into which a bolt, not shown, may be screwed to permit withdrawing this member when required for maintenance purposes.

This bearing support member 34 closes off the bore of the tubular rotor shaft and provides inner support for the outer race 37 of a double row ball thrust bearing 38. This outer bearing race is retained against axial outward displacement by an annular retaining flange 39 which is secured to the rotor shaft as by screws 40.

The rotor shaft is sealed to the end closure member by a usual packing gland 41. This gland retains packing 42 in a recess formed in an annular member 43 welded on the inside of the end closure member 27 around a central shaft opening 44 therein. The packing gland 41 is drawn down into sealing position by cap screws 45. The inner race 47 of the ball bearing 38 is mounted on the cylindrical inner portion 48 of a stud 49. The inner race 47 is held solidly against a shoulder 50 on the stud by a retaining nut 51 which is screwed onto the threaded inner end of the stud.

An intermediate portion 52 of the stud is tapered to have a close fit within a similarly tapered central opening in a mounting plate 53. This tapered portion of the stud is slightly shorter than the length of the tapered opening in which it is mounted. The stud is drawn down to a close rigid fit within its tapered opening by a nut 54 and lock washer 55. The mounting plate 53 is secured by cap screws 56 in steam tight relation to an annular support 57 welded concentrically of the end closure member 27.

The other or right hand end of the rotor shaft is counterbored similarly to the left hand end thereof, previously described, and is supported in a generally similar manner. The right hand end, however, is supported on a two row roller bearing 58 which allows limited axial adjustment of the shaft to compensate for expansion and contraction which may be caused by sudden relative changes in temperature between the rotor shaft 33 and the rotor housing 10.

The rotor 11 is mounted on the rotor shaft 33 and is secured thereto as by positioning pins 59 (Fig. 3). The rotor has a hollow central hub portion 60, the ends of which taper outwardly, as at 61 and 62. The outer ends of the rotor hub are bored to receive the shaft 33 therein. Vent holes 63 communicate between the interior of the hollow hub portion 60 and the housing.

The portion of the rotor which, when assembled as shown in Fig. 3, lies within the cylindrical central portion 12 of the housing, comprises a pair of annular end plates 64 and 65, formed integrally with the hub. The peripheries of these rotor end plates are spaced inwardly from the inside of the cylindrical central housing portion 12 to provide edge clearance as at 67, Figs. 3 and 4. A plurality of planiform radial partitions 68 are formed integrally with the rotor hub 60 and annular end plates 64 and 65. In the form illustrated, Fig. 4, nine of these radial partitions are provided, which form nine intermediate fruit or vegetable receiving pockets 69 therebetween. An inwardly extending boss 70 is provided interiorly around the marginal edge of each pocket, and pocket liners 71, which preferably area fabricated from stainless steel sheet, are mounted on the bosses by machine screws 72.

A sealing groove 73 of rectangular section is provided in the radially outward edge of each of the partitions 68, and a sealing vane 74 of T configuration in cross section has a stem portion 75 thereof adapted to fit closely and slidably within the groove 73. The radially outward head surface of the T section vane is curved to conform to the interior surface of the central housing portion 12. A plurality of coil compression springs 77 are mounted in holes 78 drilled in the bottom of each of the grooves 73, as best shown in Fig. 3, and bear against a stiff metal strip 79 which is inserted between the springs 77 and the sealing vanes 74.

The purpose of the intermediate strip 79 is to facilitate insertion of the sealing vanes, which are inserted endwise in their respective grooves 73 after the rotor 11 has been mounted in the central housing portion 12, and while at least one of the end closure members 27 or 28 is removed therefrom. The strip 79 thus acts to compress each of the springs 77 as the inserted end of the sealing vane approaches it upon insertion of the vane.

Rotor end sealing rings 80 and 81, Figs. 3, 4, 5, and 6 are mounted to bear against the marginal portion of the outer face of each of the rotor end plates 64 and 65. The sealing rings are similar to, but reversed from, each other. They are machined to have a tight sealing fit against the rotor end plates, and also, peripherally, against the inside of the rotor housing 10. In making the sealing rings, they first are machined to have a slightly larger diameter than the housing. Then a segment, as at 82, Figs. 5 and 6, is cut therefrom to leave ends 83 and 84, Figs. 5 and 6, spaced apart.

A gap sealing plate 85 of stiff sheet material, such as stainless steel, is fitted into recesses 87 and 88 on the inner side faces of the sealing rings beyond the ends 83 and 84, respectively. The inner face of the gap sealing plate 85, which is the right hand face, as illustrated in Fig. 6, then lies flush with the remainder of the inner face of the ring. The gap sealing plate is secured to one end of the ring as by rivets 89. Its other end normally is spaced slightly from the end of the recess in which it is mounted as at 90. When the ring is compressed, however, to fit into the cylindrical bore of the rotor housing, the end of the gap sealing plate is adapted to lie closely adjacent the end of its recess.

When thus compresed, the natural spring of the metal from which the sealing ring is made urges it radially outwardly toward sealing relation with the housing. However, an additional, and adjustable, ring expanding force for urging the sealing ring into close peripheral engagement with the bore of the rotor housing may be provided by a coil compression spring 91, one end of which is mounted over a stud 92 threaded into the end of the sealing ring. The other end of the spring 91 abuts against a washer 93 supported on an enlarged intermediate portion 94 of a pressure adjusting screw 95. The adjusting screw has one end 97 thereof adapted to be inserted within the coil spring 91. The other end 98 of the adjusting screw is threaded to screw into a threaded opening 96 in the other end 83 of the sealing ring.

A plurality of wrench holes 99 are provided transversely through the enlarged intermediate portion 94 of the pressure adjusting screw to receive a pin or nail, not shown, which can be used as a wrench for turning the screw 95. A lock nut 100 is provided to secure the screw 95 in adjusted position.

The rotor end sealing rings 80 and 81 are pressed into endwise sealing engagement with the rotor by a plurality of compression springs 101, Fig. 3, which are mounted in sockets 102, Figs. 3 and 7, of a pair of spring mounting, pressure adjusting rings 103. The pressure adjusting rings are here illustrated as being mounted one in each of the end closure members 27 and 28. The spring mounting rings are free for limited axial movement. Each comprises a ring 103 of angular cross section, as shown in Fig. 3, with a plurality of sockets 102, which may comprise short lengths of pipe of suitable internal diameter, welded at selected intervals within the angle of the ring. The axes of these sockets preferably are parallel to each other and to the axis of the ring.

Adjustment of the pressure exerted by the springs 101 against the sealing rings 80 and 81 is provided by a plurality of adjusting screws 104. These screws are screwed through threaded openings in the end closure members 27 and 28 and studs 105 welded thereon. The inner end portions of the adjusting screws are unthreaded as at 107 and pass through guide holes in brackets 108 welded to extend inwardly from the sides of the end closure members. Sealing caps 109 are threaded onto the studs 105 to enclose the head ends of the adjusting screws to seal them against the escape of steam from the housing after turning the screws to adjust the spring pressure.

The spring mounting rings 103 and sealing rings 80 and 81 are anchored against rotation relatively to the housing by an elongated socket 110 with an anchor pin 111 slidably mounted therein. The sockets 110 preferably are of smaller diameter than the spring sockets 102. These anchoring sockets 110 project axially outwardly beyond the spring mounting ring 103, as shown in Fig. 3, and are inserted in brackets 112 welded to the inner face of the end closure members 27 and 28, respectively. A spring 113 is held in compression between the outer end of each anchoring pin 111 and the inner end of its socket 110 to force the inner end of the pin into an indentation 114, Figs. 3, 5, and 6, in the outer face of each sealing ring.

A plurality of radially disposed ribs 115 are formed on the outer face of the left hand rotor end plate 64 as shown in Fig. 3. Seats 117 are machined on the outer ends of these ribs for mounting a bevel ring gear 118 thereon. The ring gear is secured to the rotor by nuts 119 screwed onto studs 120, which, in turn, are screwed into threaded openings in the rotor.

A drive pinion 121 is keyed to a drive shaft 122 which passes through a usual packing gland 123 to prevent the escape of steam from between the drive shaft and the housing. The pinion has toothed driving engagement with the ring gear 118.

An inspection opening 124 is provided in the end closure member 27 adjacent the pinion and is closed by a usual oval sealing plate 125. The sealing plate is retained in position by a usual bolt 127 and bridging member 128.

In order to release any steam which might be trapped in the grooves 73 beneath the T-shaped sealing vanes 74 before they pass into registry with the discharge opening 17 of the housing 10, a recess 129, see Figs. 4, 5, and 6, is provided in the inner face of the sealing ring 81 to register with each groove 73, see Fig. 3, beneath its respective sealing vane 74, just prior to, and during the time the sealing vane passes into registry with the discharge opening. This recess 129 opens into a compression fitting 131 threadedly inserted in the opposite side of the ring from the recess 129. A tube 132 is connected to the compression fitting and passes outwardly through a packing gland 133 mounted in an opening in the housing end closure member 28. The tube 132 opens to the atmosphere at a suitable point of discharge.

The condensing hood E for catching and condensing any steam which may escape from the rotor pockets 69 as they open into the discharge opening 17, see Figs. 1 and 2, comprises an elongated sheet metal hood 134. The open inner end of the hood is secured to the rotor housing to surround the rotor discharge opening 17. A discharge opening 135 also is provided in the bottom of the hood 134 to permit the peeled products and spray water and condensate to pass by gravity therethrough.

A planiform dividing sheet 137 is mounted within the hood transversely thereof at a slight, acute angle from its longitudinal mid-plane. The lower end of this dividing sheet is spaced from the discharge opening 17 of the rotor housing 10 so as not to interfere with the flow of food products discharged therefrom. The upper end of the dividing sheet 137 is spaced from the upper inner end of the hood. This sheet thus divides the hood into a pair of tapered passages 138 and 139 which taper from their inlet toward their discharge ends.

A plurality of perforated water spray pipes 140 are mounted across the tapered passages 138 and 139, their spray openings being pointed in the direction of air and steam flow which it is desired to induce through the condenser.

By this arrangement any residual steam released from the rotor pockets at the time they open into the discharge opening will be drawn upwardly over the upper surface of the dividing sheet 137 and thence through the tapered passages 138 and 139 in the direction of the arrows in Fig. 2. During this flow through the condenser any such steam will be effectively condensed. This condensing of the discharge steam may be important at times, since under some conditions, for example, when peeling vegetables or fruit which have been stored for some time, it has been found helpful to treat the vegetables with a corrosive substance, such as a lye bath, before subjecting them to steam peeling.

In operating the illustrated embodiment of the present invention, the rotor 11 is driven to rotate in the direction of the arrows 11a in Figs. 2 and 4. The rotor speed is adjusted through the adjustable speed drive motor 4, and the speed of feed of food products through the washing or treating vat A is regulated by its adjustable speed motor H, to conform with the rate of travel of the conveyor B so as to fill each pocket of the conveyor to a suitable degree. The rate of travel of the conveyor, in turn, is coordinated with that of the rotary steam peeler D, so that as each successive pocket 69 of the rotor of the steam peeler is presented in a substantially upright position to the intake opening 15 in the rotor housing 10, the rotor pocket will be filled with the products to be peeled. The amount supplied to each rotor pocket should be such that none of the product will be damaged by shearing when the pocket of the rotor is swung beyond the intake opening by rotation of the rotor. A suitable charging rate has been found to be approximately 80 to 85% of capacity.

The uppermost steam inlet pipe 22a has the flow of steam therethrough adjusted by the manually controlled valve 25 so that sufficient steam will be introduced into each product filled rotor pocket, before it is sealed off from the charging opening 15, to purge the pocket of air.

The three next lower steam inlet lines 22b, 22c, and 22d preferably have their control valves opened to provide a full flow of steam through the passages 18 and the openings 20 into the rotor pockets.

The lowermost pipe 24 preferably is arranged to discharge to the atmosphere so that each rotor pocket will be substantially relieved of steam pressure before moving into registration with the discharge opening 17. Steam trapped beneath the sealing vanes will be released by the registering of the vane grooves 73 with the recess 129 which frees the trapped steam for passage to the atmosphere through the fitting 131 and the tube 132. Any residual steam which remains in the pocket as it opens into the discharge opening will be discharged and drawn up into the hood E and condensed.

As the pockets register with the discharge opening, it will be noted that they have swung from their upright position at the charging opening to a substantially inverted position, Fig. 4, with the lower side thereof inclined steeply so that the food products therein will fall by gravity through the discharge opening. During this transition, the food products in each pocket will be tumbled over each other due to the swinging inverting movement of the pocket to expose all parts of the products to the action of the steam.

After being discharged from the peeler, the products are subjected to spray washing on the shaker table F to separate the skins from the peeled products.

While I have illustrated and described a preferred embodiment of my invention, it will be understood by those familiar with the art that the device is capable of modification without departing from the spirit of my invention. It is desired, therefore, not to limit the invention except as defined in the following claims.

Having thus described my invention, what I claim as new and desire to protect by Letters Patent is:

1. A steam peeler for peeling thin skinned food products comprising a chamber of circular vertical cross sectional shape, a rotor having a plurality of peripherally exposed food receiving pockets therein pivoted on a horizontal axis concentrically of the chamber, to swing the rotor pockets in a vertical plane about said common axis, said chamber having a charging opening and a downwardly directed discharging opening therein spaced apart in one rotative direction about the common axis by an angular distance substantially greater than the angular extent of one of said pockets, a sealing ring on each side of said pockets in sealing relation with said chamber and said rotor to seal off said pockets from said chamber laterally exteriorly thereof, a sealing strip mounted between adjacent pockets and biased toward sealing engagement with the chamber between said charging and discharging openings to seal adjacent pockets from each other, steam pressure supply means, a passage interconnecting each pocket with said steam supply means during its movement from the charging to the discharging opening and terminating short of the discharging opening to raise the temperature of subcutaneous moisture of said products above its atmospheric boiling point, and steam pressure release means opening from each pocket beyond said steam pressure supply means to reduce the pressure in the pocket substantially to atmospheric thereby to vaporize such heated subcutaneous moisture of food products in the pocket to free the skin thereof from the product.

2. An arrangement as set forth in claim 1 wherein the sealing strips are mounted in sealing grooves extending transversely between the sealing rings, one of said sealing rings having a recess therein laterally adjacent the chamber discharge opening and at a radial distance from the rotor axis to communicate with each of said grooves prior to their entrance into the discharge opening, and means connecting said recess to the atmosphere to release steam which may be trapped in the grooves beneath the sealing strips.

3. An arrangement as set forth in claim 1 wherein each sealing ring has a gap in a side thereof to form separate ends, a plate flush mounted in the sides of said ends to bridge said gap, one end of said plate being secured to one end of said ring to permit limited radial flexing of said ring; and adjustable spring pressed expanding means interposed in biased condition between the ring ends to exert a resilient expanding force on said ring.

4. A steam peeler for peeling thin skinned food products comprising a cylindrical chamber with horizontal axis, said chamber having an upwardly exposed charging opening and a downwardly directed discharging opening therein, end closure members secured to said chamber, a plate having an inwardly projecting bearing support sealed over an opening centrally of an end plate, a bearing race secured on said support, a rotor shaft having an axial end opening therein, a second cooperating bearing race in said shaft opening mounted coaxially with said first race, rolling elements interposed between the inner and outer races to form a friction reducing sealed bearing rotatably supporting the shaft coaxially of the rotor chamber, a hub mounted concentrically on the shaft to rotate therewith, a plurality of partition walls extending in radial planes from said hub and terminating short of the chamber wall, a pair of circular rotor end plates overlying the ends of said partition walls to form therewith a plurality of peripherally open product receiving pockets adapted to open successively to the charging and discharging openings of said chamber upon predetermined rotative movement of the rotor, said plates being spaced axially inwardly from said end closure members, steam pressure supply means for injecting steam under pressure into said pockets during rotor rotative movement to purge air therefrom and to raise the temperature of subcutaneous moisture of products in said pockets above their atmospheric boiling point, said steam passages terminating beyond the angular extent of a pocket ahead of the discharge opening, and a steam pressure release passage opening exteriorly of the chamber adjacent the discharge opening to reduce pressure in the pocket and thereby free the heated subcutaneous moisture for vaporization to release the skin from the product, and driving means for the rotor comprising a drive gear mounted concentrically on one of the rotor end plates, a packing gland mounted in an opening in the end closure member adjacent the ring gear, a drive shaft pivoted in sealed relation in a packing gland, and a driving pinion secured to the inner end of the drive shaft in toothed drive engagement with the ring gear.

5. A steam peeler for fruits and vegetables comprising a casing and a rotor mounted for turning therein, said rotor having pockets therein for moving the products in said casing, and sealing means connected with each of said pockets to individually seal the latter in said casing comprising radially outwardly urged vanes disposed in sealing contact with the casing, and annular sealing means carried by said casing and disposed in axial contact with the pocket ends and with said vanes to thus completely seal each pocket of the rotor at the casing end thereof.

6. A steam peeler for food products such as fruit and vegetables comprising a stator having a cylindrical bore, a rotor mounted co-axially therein and having a plurality of product receiving pockets in the periphery thereof, a sealing strip of a length equivalent to the axial dimension of said pockets mounted between adjacent pockets and biased toward sealing engagement with said stator bore, a sealing ring on each side of said rotor in resilient sealing engagement with said stator bore, and means urging said ring axially into sealing engagement with the ends of said pockets and said sealing strips.

7. A steam peeler for fruits and vegetables comprising a casing and a rotor mounted for turning therein, said rotor having pockets therein for moving the products in said casing, and sealing means connected with each of said pockets to individually seal the latter in said casing comprising radially outwardly urged vanes disposed in sealing contact with the casing, and annular sealing means operatively disposed between said rotor and casing in axial contact with the pocket ends and with said vanes to thus completely seal each pocket of the rotor at the casing end thereof.

WILLIAM DE BACK.

References Cited in the file of this patent

UNITED STATES PATENTS

| Number | Name | Date |
| --- | --- | --- |
| 1,173,230 | Vandreuil | Feb. 29, 1916 |
| 1,596,135 | Wilson | Aug. 17, 1926 |
| 2,086,539 | De Bethume | July 13, 1937 |
| 2,213,453 | Schmidt | Sept. 3, 1940 |
| 2,490,112 | Winters | Dec. 6, 1949 |
| 2,534,648 | Wilbur | Dec. 19, 1950 |